No. 690,523. Patented Jan. 7, 1902.
S. N. HOUSE.
COLD TIRE SHRINKING MACHINE.
(Application filed May 27, 1901.)
(No Model.) 2 Sheets—Sheet 1.
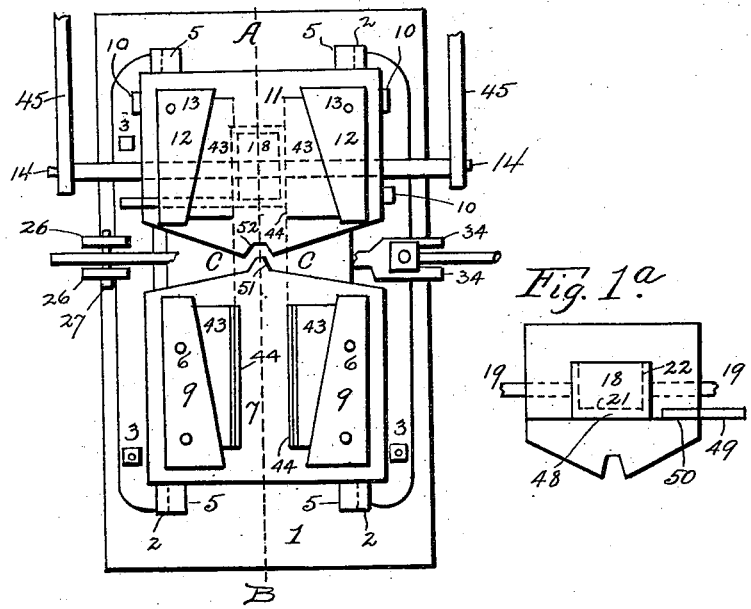
Fig. 1.
Fig. 1a.
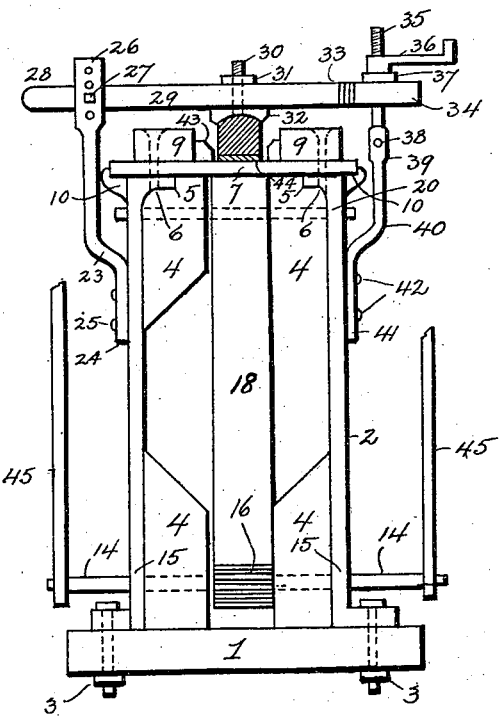
Fig. 2.
Witnesses
George D. Richards
Elmer Seavey
Inventor
Samuel N. House,
by W. H. Babcock
Attorney No. 690,523. Patented Jan. 7, 1902.
S. N. HOUSE.
COLD TIRE SHRINKING MACHINE.
(Application filed May 27, 1901.)
(No Model.) 2 Sheets—Sheet 2.
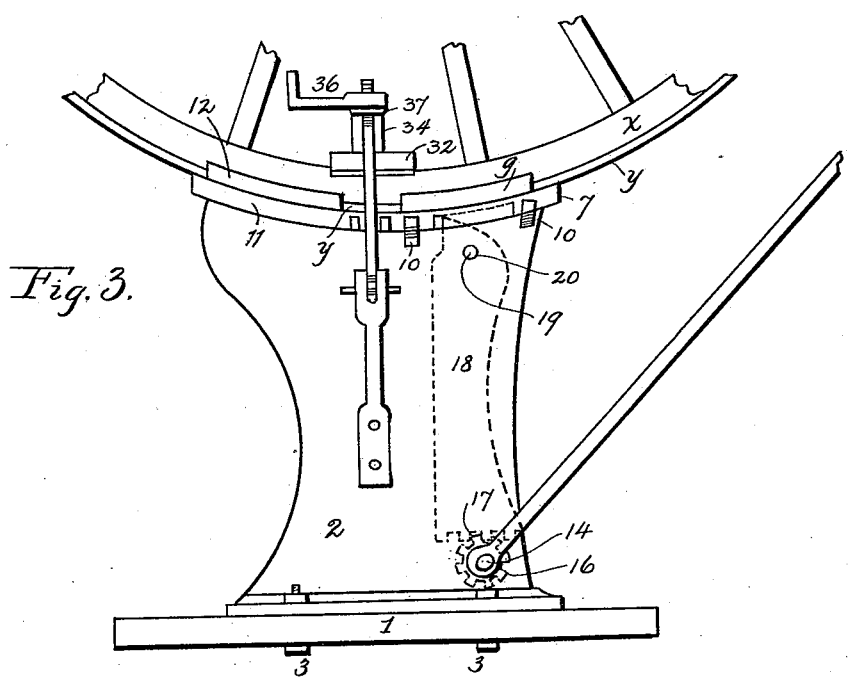

UNITED STATES PATENT OFFICE.

SAMUEL N. HOUSE, OF DALLAS, TEXAS.

COLD-TIRE-SHRINKING MACHINE.

SPECIFICATION forming part of Letters Patent No. 690,523, dated January 7, 1902.

Application filed May 27, 1901. Serial No. 62,125. (No model.)

*To all whom it may concern:*

Be it known that I, SAMUEL N. HOUSE, a citizen of the United States of America, residing at Dallas, in the county of Dallas, State of Texas, have invented a new and useful Improvement in Cold-Tire-Shrinking Machines for Vehicle-Wheels, of which the following is a specification.

The said invention consists in the construction and combination of parts hereinafter more particularly set forth and claimed.

Figure 1 is a plan view of the device complete with a portion of the clamp-bar removed. Fig. 1ª is an inverted view of the sliding block. Fig. 2 is an end elevation of the device complete, showing the felly and tire of the wheel in cross-section in position for shrinking. Fig. 3 is a side elevation of the entire machine. Fig. 4 is a cross-section through the machine, as in $a$ to $b$, Fig. 1. Fig. 5 is a plan view of the tire-wedge. Fig. 6 is a cross-section through the same from $c$ to $d$.

Similar characters of reference refer to similar parts throughout the several views.

The base-block 1 and the vertical standards 2, secured to the base-block by bolts 3, constitute the frame of the device. The standards 2 are made thicker at the points indicated by the numeral 4, the purpose of which will be hereinafter explained. Each of the standards is provided with flanges 5, which are rigidly secured by bolts 6 to the block 7, which forms the table or upper plane of the machine. To the upper surface of the block 7 are rigidly secured (also by bolts 6) two other blocks 9. At the frontal end of the device, rigidly secured to the standards, are the lugs 10, which engage the sliding block 11, which are provided with the two blocks 12, which are rigidly secured by bolts 13 to the upper surface of the sliding block 11. Near the lower end of the standards is a shaft 14, having bearings 15 on the standards, which has rigidly secured thereto a cog-wheel 16, which engages the cogs 17 on the lower end of a clamp-bar 18, the upper end of which engages an axle 19, which has its bearings 20 near the upper ends of the two standards. The clamp-bar is provided with (at the upper end) a compressing-lip 21, which extends upwardly for the full depth of the recess 22, made in the lower surface of the sliding block 11.

As shown in Fig. 2, on the left of the device is a bar 23, having its lower end 24 rigidly secured to the standard by bolts 25. The said bar extends upwardly, at the upper end of which are two prongs 26, through which is a shaft 27, which engages a clamp-bar 29, through which is a bolt 30, having a nut 31, the bolt having secured at its lower end a felly-clamp 32. The right end 33 of the clamp-bar is provided with two prongs 34, which engage a bolt 35, which is provided with a crank-nut 36 and washer 37. The lower end of the said bolt engages a bolt 38, which passes through the pronged end 39 of a vertically-disposed rod 40, which has its lower end 41 rigidly secured to the standards by bolts 42.

Before describing the operation of my device it is necessary that the following description should be made: As before stated, the block 7 is rigidly secured to the frame of the device; but the sliding block 11 is in no way attached to the frame. The lower surface of the sliding block 11 rests upon the upper edges of the two standards, to which are secured the lugs 10, which keep the sliding block in line while in motion.

As to the operation of my device, when it is desired that a loose tire of a wheel shall be shrunk or tightened, the tire $y$ and felly $x$ of the wheel are laid across the blocks 7 and 11, as per dotted line $a$ to $b$, Fig. 1, and between the dotted lines $c\ c$. Then the four wedges 43, with serrated or toothed inner edges 44, are laid along the side of the blocks 9 9 and 12 12 in such a manner that the serrated or toothed edges will come in contact with the outer edges of the tire. The wedges are then driven by a hammer up the inclined inner edges of the said blocks 9 9 and 12 12. When the four wedges are thus tightened, with their teeth well embedded in the tire, the clamp-lever 29 is laid across the felly, the bolt 27 is adjusted through the end 28, and the clamp 32 is placed over the felly, (to prevent it from springing,) while the other end of the lever is adjusted by bolt 35 and crank-nut 36. Then the two levers 45 (which engage the shaft 14) are pulled forward, causing the action of the cog-wheel 16 on the cogs of the lever 18, which produces a forward movement of the compression-lip 21. In the first movement of the levers 45 the compression-lip 21 comes in immediate contact with the inner edge 47 of the recess in the sliding block 11. In this manner the sliding block 11 is forced forward in the direction of the fixed block 7, thus compressing the material in the tire together, tightening it around the wooden fellies. The standards are made thicker at points 4 4 4 4 to strengthen them in these parts and to keep the grip-lever in line while in motion. While in the operation of thus tightening or shrinking the tires, the sliding block is forced forward to such a distance that the compressing-lip 21 can no longer reach the sliding block 11. Then, so as to get a new hold on the tire, the levers 45 are worked in the reverse direction, which throws the lip 21 away from the sliding block, thus leaving a space 48 in between the lip 21 and the inner edge 47 of the sliding block. Within this space is placed a small steel key 49, through a groove 50, made into the sliding block, so that the sliding block 11 will move in a straight line when nearing the block 7. The block 7 has been provided with a finger 51, rigidly secured thereto, which is received in the orifice 52, made in the sliding block 11.

It is known to me that all of the different cold-tire-shrinking machines of this kind which have been invented up to this time are not sufficient in strength to shrink the heavy tires of large wagons, floats, and other vehicles, so the said machines are only used to shrink the tires for light vehicles, and it is the object of my invention to overcome this difficulty and provide a machine which will have sufficient leverage and strength to shrink the tires of the heaviest vehicles, floats, wagons, &c.

Having given a full description of my invention, what I claim, and desire to secure by Letters Patent of the United States of America, is—

In a cold-tire-shrinking machine, the combination of the base and the standards with a shaft journaled in the latter, a cog-wheel secured on the said shaft, the clamp-lever 18, pivoted at 19 and having a lip 21 and rack 17, the latter in engagement with said wheel and blocks 7 and 11 carrying the clamping-blocks 9 and 12, the block 11 being engaged by the said lip 21 for sliding movement, substantially as described.

SAMUEL N. HOUSE.

Witnesses:
J. S. TAYLOR,
A. E. JANELLI.